Figure 1:
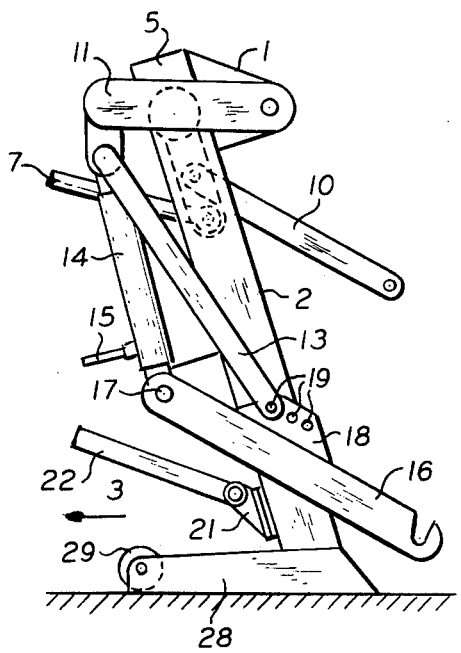

United States Patent [19]

Dreyer

[11] 4,058,180
[45] Nov. 15, 1977

[54] ATTACHING DEVICE FOR MOUNTING OF A BROADCAST FERTILIZER SPREADER ON A TRACTOR

[75] Inventor: Heinz Dreyer, Gaste, Germany

[73] Assignee: Amazonen-Werke H. Dreyer, Hasbergen-Gaste, Germany

[21] Appl. No.: 709,056

[22] Filed: July 27, 1976

[30] Foreign Application Priority Data

July 29, 1975 Germany .............................. 2533814

[51] Int. Cl.² ...................... A01C 19/00; B62D 49/02
[52] U.S. Cl. .................................. 180/14 R; 172/448; 280/456 A; 280/461 A
[58] Field of Search .......... 280/461 A, 460 A, 456 A, 280/479 R, 478 R; 111/10-13; 180/14 R; 172/448, 47; 239/661, 670

[56] References Cited

U.S. PATENT DOCUMENTS

| | | | |
|---|---|---|---|
| 2,840,933 | 7/1958 | Brem | 172/448 X |
| 3,032,123 | 5/1962 | Brown | 172/448 |
| 3,164,387 | 1/1965 | Lely | 239/661 |
| 3,213,554 | 10/1965 | Dalton | 172/448 X |
| 3,822,656 | 7/1974 | Lalor | 111/14 |
| 3,871,463 | 3/1975 | Geisthoff | 280/479 R |
| 3,899,138 | 8/1975 | Lely et al. | 239/661 |

FOREIGN PATENT DOCUMENTS 7,019,086  5/1970  Germany ...................... 280/461 A

*Primary Examiner*—Kenneth H. Betts
*Attorney, Agent, or Firm*—Burgess, Dinklage & Sprung

[57] ABSTRACT

To facilitate broadcasting fertilizer from different levels above the ground, in addition to linkages for mounting the device on a three point power hitch of the tractor, linkages and an accompanying hydraulic system are provided for elevating the spreader above the level to which the tractor power hitch can raise it. The device comprises an open frame 2 formed by upright supports 5 and a cross arm 4. The open frame construction facilitates the connection of the tractor power take-off shaft to the spreader, and the connection of linkages between the tractor and spreader for control of the metering mechanism of the spreader.

10 Claims, 6 Drawing Figures

U.S. Patent   Nov. 15, 1977   4,058,180

ATTACHING DEVICE FOR MOUNTING OF A BROADCAST FERTILIZER SPREADER ON A TRACTOR

BACKGROUND

The invention relates to an attaching device for attaching broadcast fertilizer spreaders to farm tractors, which has a frame equipped with coupling means for attachment to the toplink and power lift arms of the three-point power lift of the tractor, on which frame one secondary toplink and a pair of lower arms are pivotally mounted for connection to a broadcast fertilizer spreader driven from the tractor's power take-off shaft, one or both of said lower arms being a secondary lift arm which can be raised and lowered by means of a hydraulic jack.

An attaching device of this kind has been disclosed in German Petty Patent No. 70 19 086. This attaching device has a frame consisting of a lower crossbeam having coupling members for the lower lift arms of the tractor's three-point power lift and an upright support disposed thereon on which the coupling means for the attachment of the toplink of the three-point power lift, the secondary toplink, the secondary lift arms and the hydraulic jack of the secondary lift system are disposed.

Even though it is possible with this attaching device to use the broadcast fertilizer spreader both for the fertilizing of bare ground and for the late fertilizing of plants that have grown up, and at the same time to have ease in loading the hopper of the spreader, the design of the known attaching device as described above has the following disadvantages.

Since the middle area between the tractor and the mounted broadcast fertilizer spreader is largely occupied by the frame parts of the attaching device, the metering device or shutter of the spreader, especially when it is in the lowered position for use, can be operated from the driver's seat of the tractor only if the actuating means is of a complex and expensive construction involving a plurality of links and joints making it possible to bring the adjusting lever or levers externally around the attaching device to the tractor. A plurality of joints, however, results in inaccuracies of adjustment on account of the free play which they involved. If, however, the actuating means is of the simple design commonly used, having the adjusting lever or levers extending forward from a single bearing point, then the driver must get down from the driver's seat for each readjustment of the metering device and then get back up on it again, and in any case he must do this at each end of the field in order to close and reopen the metering device or shutter.

Furthermore, in accordance with the explanations and drawings given in the Petty Patent, it is for the same reason necessary that the driving mechanism for powering the broadcast spreader be passed around the middle part of the attaching device. For this purpose it consists of a Cardan shaft, a countershaft mounted especially on the lower part of the attaching device, a complete chain or belt drive, and a chain or belt tensioning device not further explained or represented. This tensioning device must have a large range of action and therefore must be very complex, if the spreader is to be driven between the normal lowered position with the power lift arms raised and the secondary power lift arms lowered, on the one hand, and, on the other hand, the uppermost late fertilizing position in which the power lift arms of the tractor and the secondary lift arms are raised. The driving of the broadcast fertilizer spreader in a lower position (desirable for example for the spreading of dusty types of fertilizers) in which the secondary power lift arms are lowered and the tractor power lift arms are raised only about half-way, is not possible despite the complex construction of the drive mechanism, because then the countershaft of the attaching device and the spreader stubshaft are located approximately at the same height, so that the corresponding loosening of the chain or belt drive in this case can no longer be compensated by a tensioning device.

THE INVENTION

The invention is addressed to the problem of constructing the known attaching device such that the broadcast fertilizer spreader will be able to be driven in a simple manner, without additional complication of construction, i.e., by means of a Cardan shaft, from its lowermost loading position with the power lift arms of both the tractor and the attaching device lowered, up to the uppermost late fertilizing position with the power lift arms of both tractor and attaching device raised, while at the same time the metering device of the spreader will be able to be controlled from the driver's seat of the tractor.

This problem is solved by the invention in that the frame of the attaching device constains a pair of upright supports disposed transversely of the direction of advancement of the broadcast fertilizer spreader at a relatively great distance apart, joined together at their upper part by a crossbeam, the secondary toplink as well as the coupling means for attaching the toplink of the tractor three-point power lift being disposed on the crossbeam and the secondary power lift arms and the coupling means for the attachment of the tractor's power lift arms being disposed on the upright supports, and in that the hydraulic system has a pair of hydraulic jacks also disposed transversely of the direction of advancement of the fertilizer spreader at a relatively great distance apart, these hydraulic jacks being connected at one end to the upright supports and at the other end to the secondary power lift arms.

As a result of these measures the middle area between the tractor and the fertilizer spreader is an open area through which pass not only the actuating levers of the metering device or shutter of the fertilizer spreader but also the Cardan shaft for the direct power-transmitting connection between the power take-off shaft of the tractor and the shaft of the fertilizer spreader, the levers for the adjustment of the metering device of the spreader being accessible from the tractor driver's seat in all positions of the spreader.

Furthermore, for the connection of the hydraulic jacks to the secondary power lift arms, the invention provides for two levers mounted pivotingly on the upright supports and rigidly joined together by a crossbeam, to which both the hydraulic jacks and the two connecting links attached to the secondary power lift arms are connected. In this manner it is brought about that, even in the case of non-uniform operation of the hydraulic jacks, the secondary power lift arms will be moved uniformly, so that the broadcast fertilizer spreader will be in its upright, vertical position regardless of the height at which it is operating, i.e., it will be unable to assume an undesirable tilt transversely of the direction of advancement of the tractor.

If the disposition of the hydraulic jacks on the secondary lift arms and/or connecting links is adjustable, it will be advantageously possible to change the pivoting range of the said lift arms. In this manner it is possible to use hydraulic jacks of lower power for lifting the broadcast fertilizer spreader to the upper, late fertilizing position if, in a specific application, a lower late fertilizing position is fundamentally adequate for this purpose, or if the hydraulic pump of the tractor available is not sufficient for the greater lifting power.

If the toplink of the attaching device is mounted on the coupling means serving for the attachment of the toplink of the three-point lift of the tractor, the additional advantage is achieved of a simple design for the attachment of the tractor toplink and of the toplink of the attaching device, and hence a simple design for the frame of the latter.

In a preferred embodiment, the invention provides that the coupling means for the attachment of the power lift arms of the three-point hitch of the tractor have two oppositely disposed pairs of studs, the one pair of studs being of Size 1 and the other pair of Size 2 in accordance with DIN Standard 9674, and that the coupling means can be installed releasably and interchangeably on the upright supports, the outwardly extending studs of identical size being spaced apart by the amount specified for their size in DIN Standard 9674. These measures make it possible to install the attaching device and hence the broadcast spreader on tractors of the standardized Categories I and II in a simple manner, i.e., without the use of special accessories or adapters.

If feet are provided at the bottom ends of the upright supports to enable the attaching device to stand on the ground, the attaching device, with or without the spreader mounted on it, can be placed securely on the ground. In accordance with the invention, rollers are to be provided at the ends of the feet facing the tractor. By these measures the hitching of the attaching device to a tractor, the unhitching of the device therefrom, and the setting aside of the device, with or without the spreader, are substantially facilitated, since the attaching device needs merely to be tilted and pushed on the rollers in order to move it about.

Figure 2:
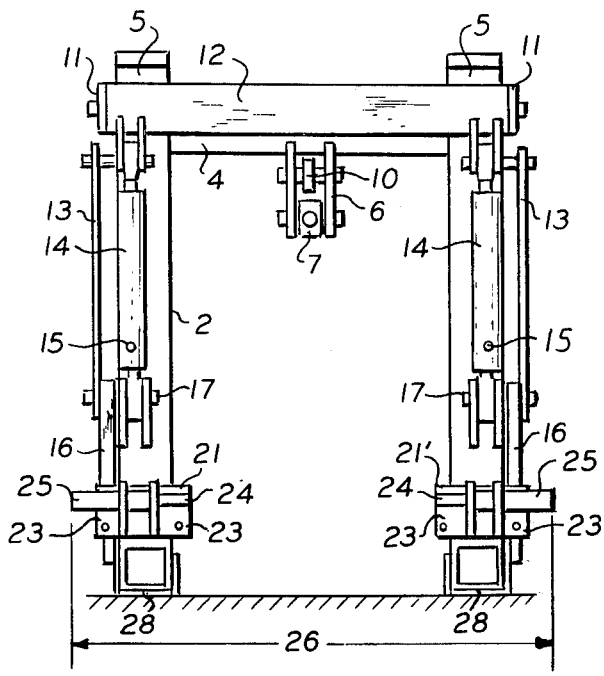
Figure 3:
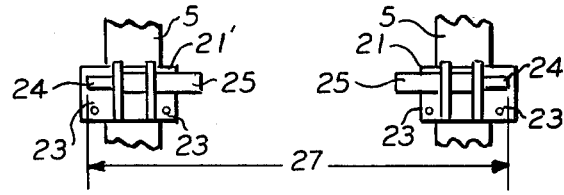
Figure 4:
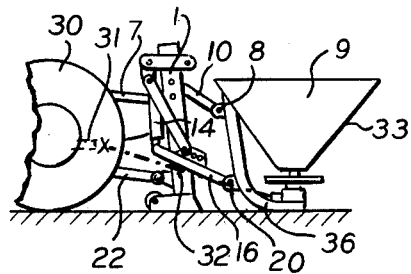
Figure 5:
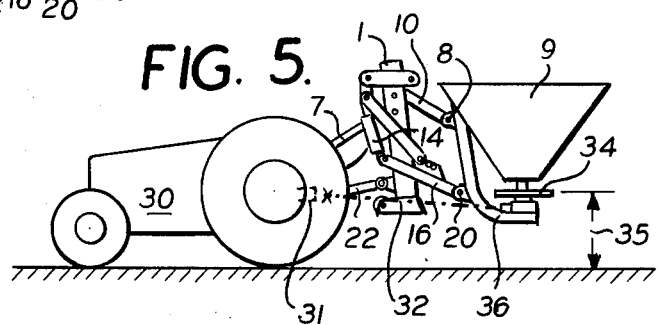

The invention will be further explained with the aid of the embodiment represented in the appended drawings, wherein FIG. 1 is a side elevational view of the attaching device of the invention, FIG. 2 is a front elevational view of the same attaching device, FIG. 3 is another front elevational view of the same attaching device, partially cut away, showing the exchanged coupling means for the attachment of the power lift arms of the three-point hitch on the tractor, FIG. 4 is a side elevational view on a reduced scale of the same attaching device installed on a tractor and carrying the broadcast spreader, showing the spreader in the loading position, FIG. 5 is a side elevational view of the assembled machinery of FIG. 4 with the broadcast spreader in the normal spreading position, and FIG. 6 is again a side elevational view of the assembled machinery of FIG. 4 with the broadcast spreader in the late fertilizing position.

The attaching device 1 has a frame 2 which consists essentially of a pair of upright supports disposed transversely of the direction of advancement indicated by the arrow 3 at a relatively great distance apart, and joined together at the top by the first crossbeam or cross arm 4. On the crossbeam 4, in the center between the supports, is provided the coupling means 6 for the attachment of the first toplink 7 of the tractor three-point power lift or hitch which is not shown in detail, the said coupling means serving simultaneously for the pivoting attachment of second toplink 10 which is to be connected at 8 to the broadcast fertilizer spreader 9.

Also pivotingly attached to the upper part of the upright supports 5 are the levers 11 whose forward ends are rigidly joined together by the second crossbeam or cross arm 12. Furthermore, a link 13 as well as one of the hydraulic jacks 14 is pivotingly attached to each end of the crossbeam 12 adjacent the forward ends of the levers 11, the hydraulic jacks being connected in a known manner by lines 15 to the hydraulic system of the tractor. In the middle part of the upright supports 5 the second pair of lower lift arms 16 are also pivotingly mounted, the bearings 17 which are provided for this purpose also supporting the bottom ends of the hydraulic jacks 14. Also, these secondary power lift arms 16 are joined to the links 13 by means of the plates 18 which have three holes 19 for the adjustment of the range of movement of the said power lift arms 16. The free ends of the secondary power lift arms 16 are hook-shaped for attachment to the broadcast fertilizer spreader at 20.

The brackets 21 and 21' for the attachment of the first pair of lower lift arms 22 of the three-point hitch of the tractor are removably fastened by means of the bolts 23 to the upright supports 5 below the bearings 17 supporting the hydraulic jacks 14 and secondary lift arms 16. These brackets 21, 21', have each one pin 24 of Size 1 and one pin 25 of Size 2 in accordance with DIN Standard 9674, these pins being made in one piece. Furthermore, these brackets 21, 21', are exchangeable with one another. If, as shown in FIG. 2, the Size 2 pins 25 extend outwardly, their outer extremities are at the distance apart 26 which is prescribed in DIN 9674. If, however, the brackets 21, 21', are exchanged with one another as shown in FIG. 3, their outer extremities will be at the distance apart 27 which is prescribed in DIN 9674.

Lastly, the standing feet 28 are welded to the bottom ends of the upright supports 5 and bear at their forward ends the caster rollers 29.

Figure 6:
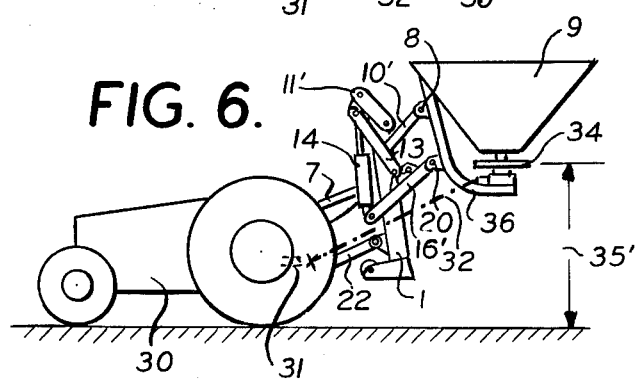

In FIGS. 4 to 6 are shown three different basic positions of the broadcast spreader 9 coupled to the tractor 30 by means of the attaching device 1, the spreader being driven from the tractor power take-off shaft 31 by means of the Cardan shaft 32.

In the loading position represented in FIG. 4, both the attaching device 1 and the broadcast fertilizer spreader 9 are resting on the ground, so that the hopper 33 of the spreader can be conveniently filled with fertilizer by hand. Here the toplink 7, the lower lift arms 22, the secondary toplink 10 and the secondary lift arms 16 are in a lowered position, the hydraulic jack 14 being in the retracted state.

FIG. 5 shows the normal operating position of the broadcast spreader 9, in which the spreader disks 34 of the spreader are at a distance 35 above the ground, of about 0.80 m. To bring the spreader into this position the three-point power lift of the tractor 30 is operated until its toplink 7 and its lift arms 22 are in a raised position, while the hydraulic jacks 14 remain in the retracted position so that the secondary toplink 10 and lift arms 16 are in their lowered position.

In the late fertilizing position represented in FIG. 6, the spreader disks 34 of spreader 9 are at a distance 35' above the ground of about 1.80 m. The toplink 7 and lift arms 22 of the three-point hitch of tractor 30 are again in their raised position. To reach this late fertilizing position, the hydraulic jacks 14 are fully extended, so that the levers 11 are in the raised position 11', and by means of these levers 11 and the links 13 the secondary power lift arms 16 are likewise pivoted into their uppermost position 16'. At the same time the spreader 9 also raises the secondary toplink 10 to its uppermost position 10'.

As it can furthermore be seen clearly in FIGS. 4 to 6, the distance between the power take-off shaft 31 of the tractor 30 and the power input shaft 36 of the fertilizer spreader 9 remains virtually the same in all three basic positions, so that in these basic positions as well as in all other possible intermediate positions, which are not shown, the same Cardan shaft 32, of conventional telescoping construction, can be used.

What is claimed is:

1. In an attaching device for a broadcast fertilizer spreader for mounting of the spreader on a tractor having a three point power lift comprising:
   a. a frame,
   b. a first top link and a coupling element for the first top link pivotally coupling the first top link to the frame, and a first pair of lower lift arms and coupling elements for the first pair of lower lift arms pivotally coupling the first pair of lower lift arms to the frame, both the first top link and the first pair of lower lift arms being for the tractor three point power lift and for actuation to raise and lower the frame by a hydraulic system of the three point power lift,
   c. a second top link pivotally mounted on the frame and a second pair of lower lift arms pivotally mounted on the frame, for attachment of the device to the spreader,
   the improvement which comprises:
   d. the frame comprising two upright supports disposed transversely of the advancement direction of the fertilizer spreader and a cross arm joining upper portions of the upright supports together,
   e. the second top link and the coupling element for the first top link being mounted on the cross arm, and the second pair of lower lift arms, and the coupling elements for the first pair of lower lift arms being mounted on the upright supports, and
   f. a hydraulic system comprising two lift jacks disposed transversely of the direction of advancement of the spreader, each jack having one end joined to one of the upright supports and the other end to the lower lift arm of the second pair of lower lift arms which is coupled to said one upright support.

2. Attaching device of claim 1, characterized in that, for the joining of the hydraulic jacks, the device comprises two levers disposed pivotingly on the upright supports and rigidly joined together by means of a second crossbeam, both the hydraulic jacks being secured to the uprights by attachment to said levers, and two supports attached at one end to the levers and the other end to the second pair of lower lift arms.

3. Attaching device of claim 1, characterized in that said joining of the hydraulic jacks is adjustable.

4. Attaching device of claim 1, characterized is that the second top link is pivotally mounted on the frame by being joined to said coupling element for the first top link.

5. Attaching device of claim 1, characterized in that the coupling elements for the first pair of lower arms each have two studs oriented oppositely to one another, one of the studs of each of the coupling elements being a first size, the other of the studs of each of the coupling elements being a second size, so that the studs of the first size can be disposed on the uprights at a first transverse spacing, and the studs of the second size can be disposed on the uprights at a second transverse spacing.

6. Attaching device of claim 1, characterized in that feet are provided at the bottom ends of the upright supports for standing the attaching device on the ground.

7. Attaching device of claim 6, characterized in that rotatably disposed caster rollers are located at the ends of the standing feet facing the tractor side of the device.

8. Attaching device of claim 1, characterized in that, for the joining of the hydraulic jacks, the device comprises two levers disposed pivotingly on the upright supports and rigidly joined together by means of a second crossbeam, both the hydraulic jacks being secured to the uprights by attachment to said levers, and two supports attached at one end to the levers and the other end to the second pair of lower lift arms, characterized in that said joining of the hydraulic jacks is adjustable, characterized in that the second top link is pivotally mounted on the frame by being joined to said coupling element for the first top link, characterized in that the coupling elements for the first pair of lower lift arms each have two studs oriented oppositely to one another, one of the studs of each of the coupling elements being a first size, the other of the studs of each of the coupling elements being a second size, so that the studs of the first size can be disposed on the uprights at a first transverse spacing, and the studs of the second size can be disposed on the uprights at a second transverse spacing, characterized in that feet are provided at the bottom ends of the upright supports for standing the attaching device on the ground, characterized in that rotatably disposed caster rollers are located at the ends of the standing feet facing the tractor side of the device.

9. Attaching device of claim 8, characterized in that the device comprises a Cardan shaft of telescoping construction for interconnection of a power take-off shaft of the tractor and the spreader for driving of the spreader.

10. Attaching device of claim 1, characterized in that the device comprises a Cardan shaft of telescoping construction for interconnection of a power take-off shaft of the tractor and the spreader for driving of the spreader.

* * * * *